United States Patent [19]
Albiol-Catalan

[11] Patent Number: 4,773,527
[45] Date of Patent: Sep. 27, 1988

[54] WEIGHING MACHINE FOR ARTICLES OF IRREGULAR AND ELONGATE SHAPE

[76] Inventor: José Albiol-Catalan, Manuel de Falla, 16 Barbera Del Valleys, Barcelona, Spain

[21] Appl. No.: 837,284

[22] Filed: Mar. 6, 1986

[30] Foreign Application Priority Data

Mar. 6, 1985 [ES] Spain .................................. 541645

[51] Int. Cl.⁴ ............................................. G01G 11/08
[52] U.S. Cl. .................................. 198/505; 198/367; 198/580
[58] Field of Search ............... 198/505, 358, 363, 364, 198/365, 367, 370, 448, 550.3, 720, 580; 177/25.18, DIG. 11, 123; 364/478, 567; 414/273

[56] References Cited

U.S. PATENT DOCUMENTS

| | | | |
|---|---|---|---|
| 2,728,466 | 12/1955 | Postlewaite et al. | 198/580 X |
| 3,224,553 | 12/1965 | Campbell | 198/580 X |
| 4,333,394 | 6/1982 | Brown | 198/505 X |
| 4,518,302 | 5/1985 | Knapp | 414/273 |
| 4,522,274 | 6/1985 | Konishi et al. | 177/25.18 |
| 4,538,693 | 9/1985 | Klopfenstein et al. | 177/25.18 |
| 4,548,287 | 10/1985 | Matsuura | 177/25.18 |
| 4,569,446 | 2/1986 | Kelley | 177/123 X |

*Primary Examiner*—Robert J. Spar
*Assistant Examiner*—Lyle K. Kimms
*Attorney, Agent, or Firm*—Wenderoth, Lind & Ponack

[57] ABSTRACT

The weighing machine comprises a number of aligned weighing receptacles which receive the irregular elongate articles in spaced-apart relationship from a supply apron supplied by a vibrating device from a receiving hopper, and a return device to the receiving hopper for recycling the irregular elongate articles not supplied to the weighing receptacles. The weighings of the weighing receptacles are computerized and the optimal weighing combination is selected within a predetermined margin among the weighings of an arbitrary number of a group of weighing receptacles associated with one weighing machine or with two weighing machines disposed one opposite another, as the case may be.

6 Claims, 2 Drawing Sheets

WEIGHING MACHINE FOR ARTICLES OF IRREGULAR AND ELONGATE SHAPE

FIELD OF THE INVENTION

This invention relates to an automatic multiple weighing machine for articles of irregular, more particularly elongate, shape.

BACKGROUND OF THE INVENTION

Weighing machines for weighing substantially granular articles, such as dried fruits which are usually spherical and relatively uniform, are known. Such machines basically comprise a top hopper which delivers the product to a lower substantially conical surface, the latter distributing the product to a number of weighing facilities which can provide a fairly approximate weighing. The facilities weigh the small spherical and substantially uniform articles but they are unsuitable for dealing with articles of irregular and elongate shape such as pieces of fish such as hake, salted cod or the like and foodstuffs of other kinds, which produce obstructions and therefore malfunctioning of the weighing machines.

Weighing machines for irregular elongate portions which weigh on the basis of consecutive weighings of the portions or articles entering the machine are known too. The weighings are interrupted when a predetermined weight is reached. The problem with the partial weighings is that it is very difficult to obtain an accurate or at least very approximate weight.

SUMMARY OF THE INVENTION

The automatic multiple weighing machine for articles of irregular, more particularly elongate, shape according to this invention obviates these disadvantages.

This invention relates to a weighing machine for irregular elongate articles, the machine providing very accurate weighing with a narrow margin by computerizing the weight of a group of weighing receptacles of a large number of weighing receptacles.

The invention relates to a mutliple weigher comprising:

a vibrating hopper receiving the articles for weighing;

a main vibrating channel receiving the articles from the receiving hopper and separating them slightly from one another;

a main conveyor receiving the articles from the main channel for distribution of the articles;

a number of secondary vibrating channels receiving the articles from the main conveyor;

a number of weighing receptacles receiving the articles from the respective secondary channel;

auxiliary conveying means receiving the articles from the weighing receptacles;

a delivery hopper receiving the articles from the auxiliary conveying means and supplying them manually or automatically to the next machine for subsequent treatment of the articles;

return means from the main conveyor to the receiving hopper for recycling the articles not distributed to the various secondary channels, and processor means for performing the following operations:

facilitating the distribution of the articles from the main conveyor to the various secondary channels;

weighing an arbitrary number of articles placed in each weighing receptacle within a predetermined weighing margin and blocking and indicating whichever receptacles are outside the margin;

evaluating among the weighings of all the receptacles the number of weighings of a number of receptacles whose weight lies within a predetermined weighing margin;

opening such number of receptacles having desired weighings therein to transfer the articles in them to the delivery hopper, and enabling the main conveyor to supply articles again to the emptied receptacles and continuing the cycle of operations. The main conveyor is an apron or belt conveyor and the various weighing receptacles supplied by the secondary channels are in alignment.

BRIEF DESCRIPTION OF THE DRAWINGS

FIG. 4 is a flow diagram of the operations of a processor according to the present invention.

DETAILED DESCRIPTION

The drawings illustrate a preferred embodiment of the automatic multiple weighing machine for articles of irregular, more particularly elongate, shape and comprising a bedframe 1 operative as general support for all the elements of the machine, a receiving vibrating hopper 2 receiving from appropriate supply means (not shown) the articles required to be weighed, the hopper 2 being acted on by a vibrator (not shown) to facilitate the delivery of the articles to a main vibrating channel 3 which provides a slight separation between the articles and transfers them to one end of a main conveyor 4 which is in the form of a belt or an apron and which is disposed along the machine.

Figure 1:
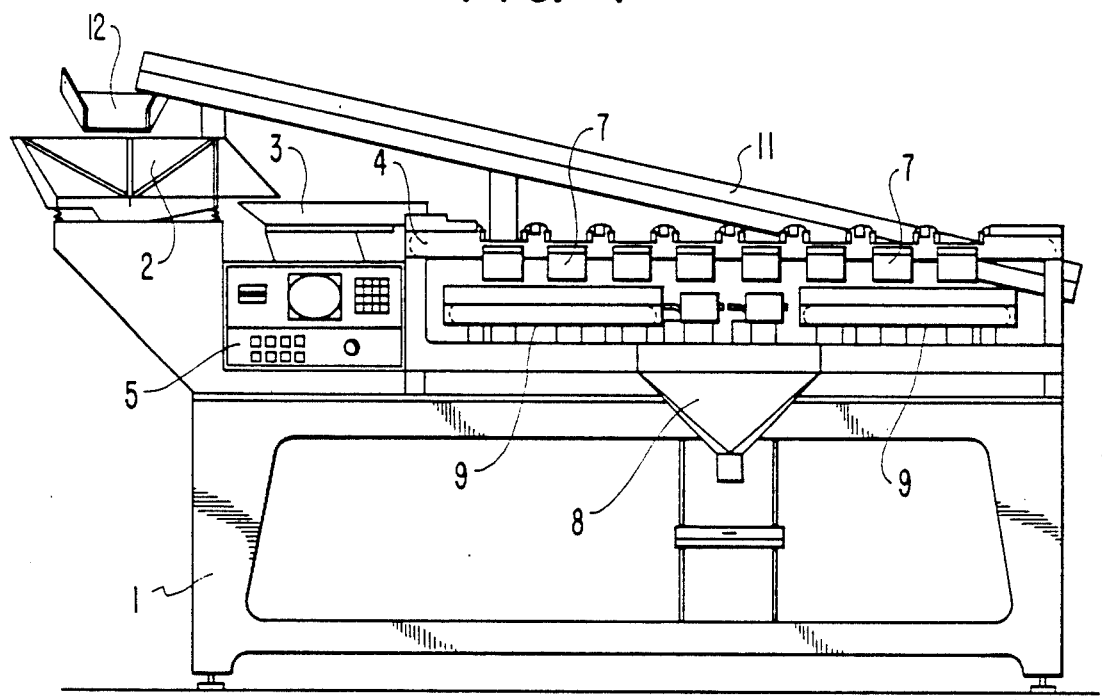
FIG. 1 is a view in front elevation of the preferred weighing machine according to the invention.
Figure 3:
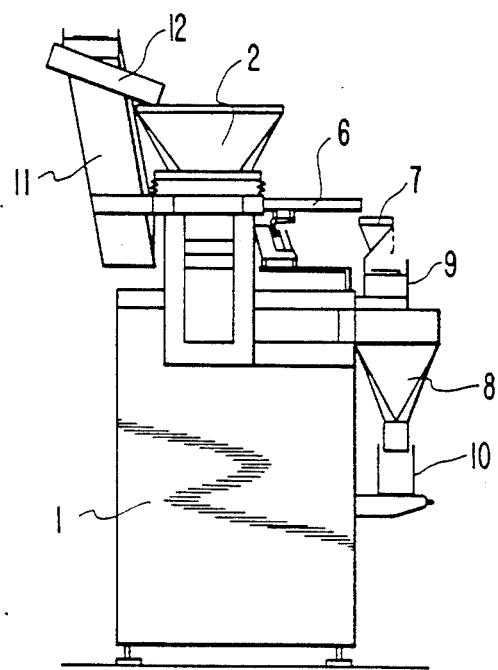
FIG. 3 is a view of the weighing machine in side elevation.
Figure 2:
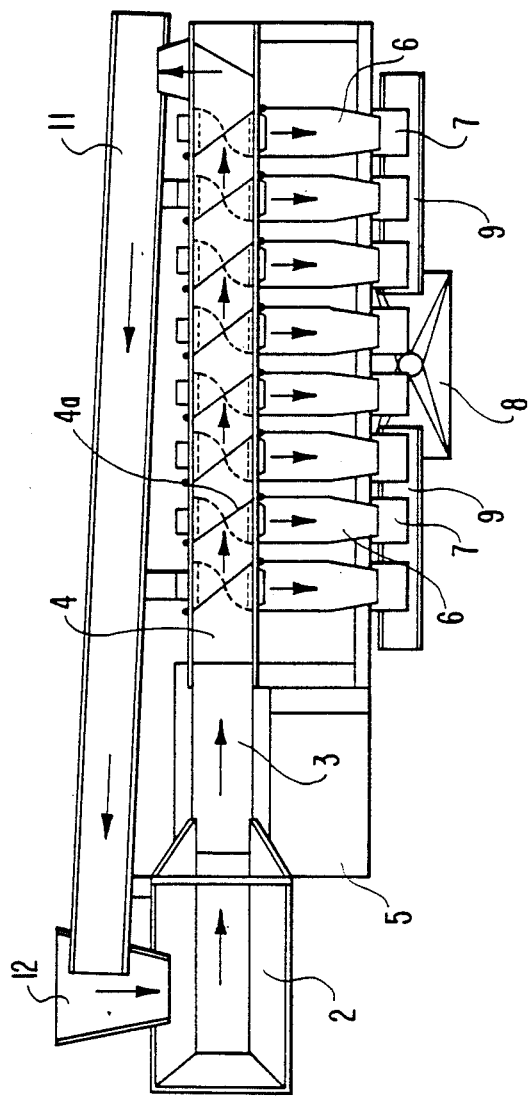
FIG. 2 is a plan view of the weighing machine.

The weighing machine has a processor 5, the operations of which are shown in FIG. 4, which instructs the main conveyor 4 to distribute the articles to a number of secondary vibrating channels 6 by way of opening blocking means or the like 4a operated by the processor 5. The secondary channels 6 deliver the articles to respective weighing receptacles 7 which automatically weigh the articles placed in them and transmit the value of the respective weighing to the processor 5, which evaluates the eight weighings (as shown in FIGS. 1 and 3) or any other number of weighings depending upon the number of receptacles used, then the processor 5 totals the weight of those receptacles, such as three or four or five or six weighings, whose sum as a set of receptacles is as accurately close as possible to the predetermining weighing within a predetermined margin, the processor then giving the corresponding instructions to open the number of receptacles corresponding to the set of such weighings for transfer of the articles in the latter receptacles to a delivery hopper 8 with the use of auxiliary conveying means 9 which previously receive the articles from the receptacles 7, the means 9 possibly taking the form of end aprons or belts for the receptacles 7 at either end. The delivery hopper 8 supplies the articles under manual or automatic control to the next machine for subsequent treatment. In the embodiment shown the articles of each weighing operation of the processor 5 are arranged, for example, in wrappings or packages or the like 10 borne by a support tray.

After each weighing operation, the processor 5 opens the blocking means or the like 4a (which have been closed temporarily by the processor 5 during the weighing operation) to refill the weighing receptacles 7 which have been emptied, whereafter a further evaluation is made.

The weighings of each weighing receptacle 7 are selected to lie within a predetermined weighing margin. However, if the weight of the articles transferred to any receptacle 7 lies outside the margin, for example, thereabove or therebelow, the processor 5 blocks the respective overfilled or underfilled receptacles 7 by actuating the blocking means 4a and indicates the particular receptacle concerned and prevents it from being included in the next weighing evaluation until the operator has rectified matters by emptying it wholly or partially.

The weighing machine comprises a return conveyor in the form of a belt or an apron 11 which receives from the other end of the main conveyor 4 the articles not distributed to the various secondary channels 6, the apron 11 returning the undistributed articles by way of a chute 12 to the receiving hopper 2 for recycling by way of the feeding by the main conveyor 4 to the emptied weighing receptacles 7, something which is under the control of the processor 5.

Although the secondary vibrating channels have been illustrated and described as being disposed just on one side of the main apron or conveyor 4, the secondary vibrating channels can be disposed on either side of the main conveyor to supply respective weighing receptacles which would in turn supply the articles to other corresponding auxiliary means 9 for delivery to the respective delivery hoppers.

This invention also discloses the arrangement of at least one pair of multiple weighing machines disposed opposite one another and preferably supplied from the common hopper, the pair of machines carrying out the weighing operation with groups of weighing receptacles which are preferably disposed one opposite another and which are associated with the two machines, the contents of the selected weighing receptacles of each group being discharged to a respective delivery hopper, the same delivering to a respective associated delivery conveyor which transfers the articles from weighing to a station for supply for the next operation. Production can therefore be increased by increasing the number of weighings per unit of time.

According to the invention, pairs of weighing machines disposed opposite one another can be arranged consecutively.

According to the invention, the weighing receptacles can comprise a self-calibrating facility to ensure that the weighing of the weighing receptacles is always correct despite sticking of some of the articles in such a receptacle.

I claim:

1. A weighing machine for articles of irregular, more particularly elongate, shape and comprising a plurality of article-weighing receptacles connected to a computerized control which selects an arbitrary number of receptacles to provide an optimal total weight of the selected receptacles lying with a predetermined weighing margin, comprising:

a vibrating hopper receiving the articles for weighing;

a main vibrating channel receiving the articles from the receiving hopper and separating them slightly from one another;

a main conveyor having one end thereof receiving the articles from the main channel for distribution of the articles;

a plurality of secondary vibrating channels receiving the articles from the main conveyor;

a plurality of weighing receptacles, each receiving the articles from a respective one of the secondary channels;

blocking means for blocking passage of articles to the receptacles;

auxiliary conveying means receiving the articles from at least one of the weighing receptacles;

a delivery hopper receiving the articles from the auxiliary conveying means and supplying them manually or automatically to the next machine for subsequent treatment of the articles;

return means extending from the other end of the main conveyor to the receiving hopper for recycling the articles not distributed to the plurality of secondary channels, and processor means for performing the following operations:

facilitating the distribution of the articles from the main conveyor to the plurality of secondary channels;

weighing an arbitrary number of articles placed in each weighing receptacle in accordance with a predetermined weighing margin and blocking passage of articles to the receptacles which have a weight outside the margin and indicating the receptacles which have a weight outside the margin;

evaluating among the weighings of all the receptacles the number of weighings of a plurality of receptacles which together comprise a set of receptacles whose weight lies within a predetermined weighing margin;

emptying the set of such plurality of receptacles to transfer the articles in them to the delivery hopper, and enabling the main conveyor to supply articles again to the emptied receptacles and continuing the cycle of operations.

2. A weighing machine according to claim 1, wherein the main conveyor is a conveyor belt extending in a longitudinal direction, the plurality of weighing receptacles supplied by the secondary channels are in alignment and the auxiliary conveying means comprises at least one belt conveyor extending parallel to the longitudinal direction and positioned to receive articles from a plurality of the receptacles and deliver the articles to the delivery hopper.

3. A weighing machine for articles of irregular, more particularly elongate, shape and comprising:

a vibrating hopper receiving the articles for weighing;

a main vibrating channel receiving the articles from the receiving hopper and separating them slightly from one another;

a main conveyor having one end thereof receiving the articles from the main channel for distribution of the articles;

a plurality of secondary vibrating channels receiving the articles from the main conveyor;

a plurality of weighing receptacles, each receiving the articles from a respective one of the secondary channels;

blocking means for blocking passage of articles to the receptacles;

auxiliary conveying means receiving the articles from at least one of the weighing receptacles;

a delivery hopper receiving the articles from the auxiliary conveying means and supplying them manually or automatically to the next machine for subsequent treatment of the articles;

return means extending from the other end of the main conveyor to the receiving hopper for recycling the articles not distributed to the plurality of secondary channels, and processor means for performing the following operations:

facilitating the distribution of the articles from the main conveyor to the plurality of secondary channels;

weighing an arbitrary number of articles placed in each weighing receptacle in accordance with a predetermined weighing margin, and blocking passage of articles to the receptacles which have a weight outside the margin and indicating the receptacles which have a weight outside the margin;

evaluating among the weighings of all the receptacles the number of weighings of a plurality of receptacles which together comprise a set of receptacles whose weight lies within a predetermined weighing margin;

emptying the set of such plurality of receptacles to transfer the articles in them to the delivery hopper, and enabling the main conveyor to supply articles again to the emptied receptacles and continuing the cycle of operations.

4. A weighing machine according to claim 3, wherein the main conveyor is a conveyor belt extending in a longitudinal direction, the plurality of weighing receptacles supplied by the secondary channels are in alignment and the auxiliary conveying means comprise at least one belt conveyor extending parallel to the longitudinal direction and positioned to receive articles from a plurality of the receptacles and deliver the articles to the delivery hopper.

5. A weighing machine according to claim 4, wherein the main conveyor is provided with a plurality of said blocking means associated with the secondary vibrating channels for blocking or allowing passage of the elongate irregular articles to the respective weighing receptacles, the blocking means being operatively connected to the processor means for selectively actuating the respective blocking means to block or allow passage of articles to respective vibrating channels.

6. A weighing machine according to claim 3, wherein the return means comprise a second return conveyor belt combined with respective chutes at the initial and final ends, of which the initial chute collects the articles not distributed by the main conveyor and delivers them by the final chute to the receiving hopper.

* * * * *

UNITED STATES PATENT AND TRADEMARK OFFICE
CERTIFICATE OF CORRECTION

PATENT NO. : 4,773,527

DATED : September 27, 1988

INVENTOR(S) : Jose ALBIOL-CATALAN

It is certified that error appears in the above-identified patent and that said Letters Patent is hereby corrected as shown below:

Title page, item [76]: the second line of the Inventor's address should read --16 Barbera Del Valles, Barcelona,--.

Figure 4 of the drawings should be added as per attached sheet.

Signed and Sealed this

Twenty-sixth Day of June, 1990

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,773,527

DATED : September 27, 1988

INVENTOR(S) : Jose ALBIOL-CATALAN

It is certified that error appears in the above-identified patent and that said Letters Patent is hereby corrected as shown below:

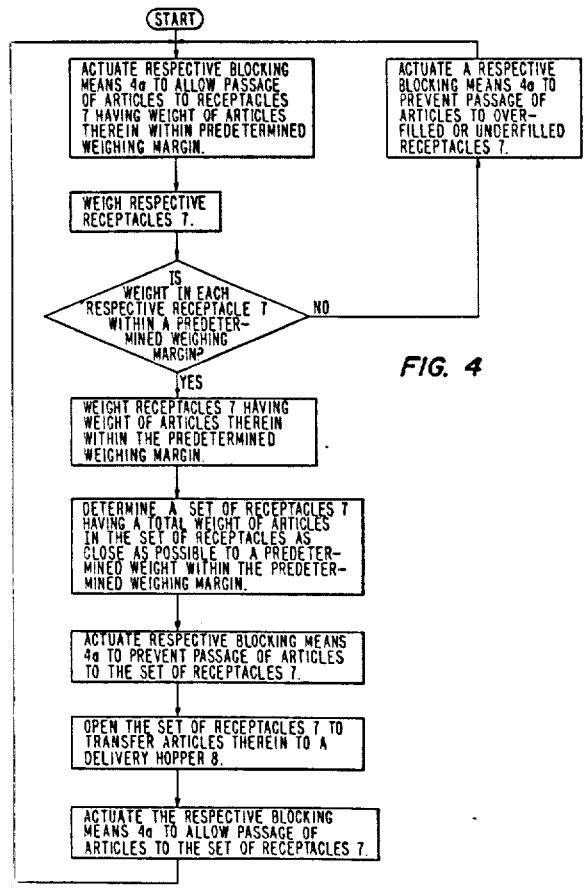

FIG. 4